(12) United States Patent
Stawitcke et al.

(10) Patent No.: US 6,798,939 B2
(45) Date of Patent: Sep. 28, 2004

(54) BUBBLE STABILITY IN AN OPTICAL SWITCH

(75) Inventors: Frederick Austin Stawitcke, Sunnyvale, CA (US); Shalini Venkatesh, Santa Clara, CA (US); Datong Chen, Fremont, CA (US); Richard Earl Haven, Sunnyvale, CA (US); Mark Andrew Troll, Seattle, WA (US); David James Anvar, Mountain View, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 144 days.

(21) Appl. No.: 10/099,116

(22) Filed: Mar. 14, 2002

(65) Prior Publication Data

US 2003/0174930 A1 Sep. 18, 2003

(51) Int. Cl.[7] .................................................. G02B 6/42
(52) U.S. Cl. ............................ 385/17; 385/18; 385/14; 385/16
(58) Field of Search ......................... 385/14–18, 24–25, 385/39–40, 130–131, 8–9, 19

(56) References Cited

U.S. PATENT DOCUMENTS

| | | | | |
|---|---|---|---|---|
| 5,210,801 A | * | 5/1993 | Fournier et al. ............... | 385/14 |
| 5,699,462 A | * | 12/1997 | Fouquet et al. ............... | 385/18 |
| 5,852,689 A | * | 12/1998 | Donald ......................... | 385/21 |
| 5,960,131 A | * | 9/1999 | Fouquet et al. ............... | 385/17 |
| 6,062,681 A | * | 5/2000 | Field et al. .................... | 347/65 |
| 6,171,652 B1 | | 1/2001 | Singh et al. | |
| 6,195,478 B1 | | 2/2001 | Fouquet | |
| 6,327,397 B1 | * | 12/2001 | Schiaffino et al. ............ | 385/16 |
| 6,360,775 B1 | * | 3/2002 | Barth et al. .................. | 137/828 |
| 6,389,189 B1 | * | 5/2002 | Edwards et al. ............. | 385/18 |
| 6,487,333 B2 | * | 11/2002 | Fouquet et al. ............... | 385/18 |
| 6,563,973 B1 | * | 5/2003 | Caracci et al. ................ | 385/17 |
| 6,674,933 B2 | * | 1/2004 | Troll ........................... | 385/16 |
| 6,718,085 B1 | * | 4/2004 | Scholz et al. ................. | 385/17 |

FOREIGN PATENT DOCUMENTS

| | | |
|---|---|---|
| EP | 0 871 053 A1 | 10/1998 |
| EP | 1 014 140 A2 | 6/2000 |
| EP | 1 267 194 A1 | 12/2002 |
| JP | 2828216 | 11/1998 |
| JP | 2871879 | 3/1999 |
| JP | 2871911 | 3/1999 |
| JP | 2994807 | 12/1999 |

* cited by examiner

Primary Examiner—Nimeshkumar D. Patel
Assistant Examiner—Dalei Dong (57) ABSTRACT

Bubble stability within an optical switch is enhanced by controlling the expansion or movement of a bubble from a liquid-containing trench into available adjacent spacing. Typically, the adjacent spacing is formed between an optical waveguide substrate and a heater substrate, where the heater substrate includes a microheater for forming the bubble. The bubble enhancement is provided by intentionally altering surface features along at least one of the substrates.

33 Claims, 10 Drawing Sheets

BUBBLE STABILITY IN AN OPTICAL SWITCH

TECHNICAL FIELD

The invention relates generally to optical switches and more particularly to techniques for promoting stability in the geometry and the placement of a bubble within an optical switch.

BACKGROUND ART

Increasingly, signal transfers within a communications network are carried out using optical signaling, with information being exchanged as modulations of laser-produced light. The equipment for generating and modulating light for optical transmissions is readily available, as are the cables for transmitting the optical signals over extended distances. However, there are concerns with regard to the switching of the optical signals without a significant sacrifice of signal strength.

Figure 1:
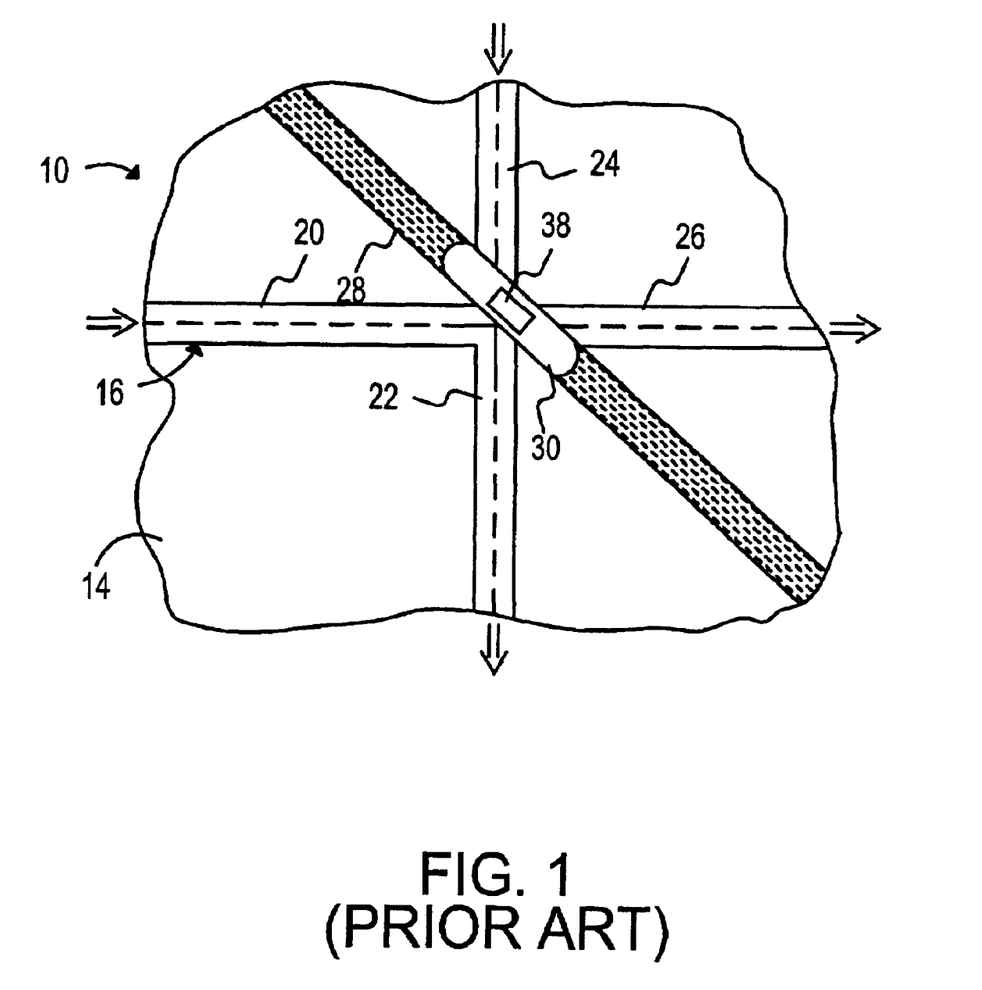
FIG. 1 is a top view of an optical switch that utilizes total internal reflectance in accordance with the prior art.

One technique for switching optical signals is described in U.S. Pat. No. 5,699,462 to Fouquet et al., which is assigned to the assignee of the present invention. An isolated optical switch that is based on the description in Fouquet et al. is shown in FIG. 1. The optical switch 10 is formed of layers that are patterned on a substrate. The waveguide layers on the substrate include an optional lower cladding layer 14, an optical core 16, and an upper cladding layer, not shown. The optical core may be primarily silicon dioxide, with doping materials that achieve a desired index of refraction. The cladding layers are formed of a material having a refractive index that is significantly different than that of the core material, so that the optical signals are guided along the core. The effective phase index of the waveguide is determined by the refractive indices of the core material and the material of the cladding layers. The layer of core material is patterned into waveguide segments that define a pair of input waveguides 20 and 24 and a pair of output waveguides 22 and 26. After the core material is formed on the lower cladding layer, the upper cladding layer is blanket deposited. A trench 28 is etched into the cladding layers and the core material. A liquid having a refractive index that substantially matches the effective phase index of the waveguides is supplied to the trench. When the liquid is aligned with the waveguides, signals will propagate efficiently through the trench. Thus, signals from the input waveguide 20 will exit from the aligned output waveguide 26, while signals from the input waveguide 24 will exit via the aligned output waveguide 22.

The first input waveguide 20 and the second output waveguide 22 have axes that intersect at or near (preferably near) a sidewall of the trench 28 at an angle of incidence that results in total internal reflection (TIR). When a bubble 30 resides at the intersection of the two axes, the refractive index mismatch creates the TIR condition in which an input signal along the input waveguide 20 is reflected into the second output waveguide 22. However, it should be pointed out that the second input waveguide 24 is not optically coupled to either of the output waveguides 22 and 26, since the misalignment of the optical axes of the waveguides inhibits optical coupling.

The patent to Fouquet et al. describes a number of alternative embodiments for switching the optical switch 10 between a transmissive state and a reflective state. In the transmissive state, the liquid within the trench fills the entire area aligned with the waveguides 20, 22, 24 and 26. One approach to switching between the two states is to include a microheater 38 that controls the formation of a bubble 30 within the liquid-containing trench 28. When the microheater is brought to a temperature that is sufficiently high to form the bubble in the index-matching liquid, the bubble is ideally positioned across the entirety of the interface between each waveguide and the sidewall of the trench. In this ideal situation, only a small quantity of the light leaks into the trench.

The problem with obtaining the ideal condition along the waveguide-to-trench interface is that a bubble is subject to many destabilizing influences. If the surface area covered by a bubble flattened against a trench sidewall is sufficient to fully encompass the lateral extent of the optical fields of the crossing waveguides, such as waveguides 20 and 22 in FIG. 1, the reflection is at a stable maximum. However, any reduction below full lateral extent of the optical fields will cause optical loss. Perhaps more importantly, any variation in the reduced area will cause the reflected optical signal to vary correspondingly. Therefore, any successful approach to confining a bubble within the trench 28 and maintaining the bubble at a sufficiently large size improves the stability of optical reflections, and so improves one important aspect of operational stability of the optical switch 10.

As one approach to providing such operational stability, the electrical power to the microheaters of optical switches may be increased to deliver ample thermal power to create and maintain the bubbles across the entirety of the interface. However, this solution has limited appeal, since the power handling constraints of a large array of optical switches and because of the desirability of operating such an array at the lowest possible power consumption level. Another approach is to appropriately design the shape and size of the trenches holding the bubbles relative to the shapes and sizes of the microheaters which create the bubbles. In the above-identified patent to Fouquet et al., a trench is extended downwardly at opposite sides of the microheater. Thus, V-shaped cuts are etched into a microheater substrate in alignment with the trench. The downward extension of the trench is intended to increase bubble stability by promoting dynamic equilibrium, with fluid boiling at the heaters and condensing at the top of the bubbles. This approach improves stability, but alternative or additional techniques are desired.

SUMMARY OF THE INVENTION

Performance stability of an optical switch that has a reflective efficiency based upon the position of a bubble within a liquid-containing trench is enhanced by allowing the liquid to flow from the trench into an adjacent space, while controlling the movement of the bubble relative to either or both of the trench and the adjacent spacing. Surface features are intentionally altered in order to regulate the position of the bubble within the trench. The optical switch includes a transmissive state in which optical signals efficiently propagate from a waveguide into the liquid within the trench, since the liquid and the waveguide have similar refractive indices. The optical switch also has a reflective state in which the optical signals are reflected as a result of the bubble being at the interface of the waveguide with the trench. The adjacent spacing accommodates volume expansion when the bubble is created by activation of a microheater, but the intentionally altered surface features are designed to control the position of the bubble relative to the waveguide-to-trench interface.

The spacing that is adjacent to the trench may be generally perpendicular to the trench. Typically, the spacing is naturally or intentionally formed when a waveguide substrate is connected to a heater substrate. In a switching network, the heater substrate includes at least one microheater for each optical switch in an array of switches. The waveguide substrate includes a liquid-containing trench and two or more waveguides for each optical switch. Coupling of the optical waveguides for a switch depends upon the presence or absence of liquid in alignment with an input waveguide of the switch. As an alternative to forming the adjacent spacing as a result of connecting two substrates, adjacent spacing that accommodates volumetric expansion may be provided by using other techniques, such as layer etching.

In one embodiment, the intentionally altered surface features that control the position of the bubble are raised barriers that partially obstruct the movement or expansion of the bubble into the adjacent spacing. For example, the raised barriers may be partial barriers that are provided by depositing or growing a material, typically a dielectric material, on the heater substrate. In one application, the barriers are positioned within the adjacent spacing on two opposed sides of the microheater, but may include portions which reside within the trench at the other two sides of the microheater. Thus, in addition to providing lateral control of the bubble position, the barrier material may provide longitudinal control along the length of the trench. During the process of fabricating an optical switch, incorporating steps of providing and patterning the barrier material is a relatively small price to pay for the long term reduction (via surface energy variations) or even complete prevention (by physically blocking) of the lateral expansion of a bubble into the spacing that is adjacent to a trench.

In a related embodiment, the surface topography is varied along a target boundary line of contact between the bubble and the structure of the optical switch. Typically, the surface topography is altered along a surface that is formed after the microheater, such as in a dielectric layer that is blanket deposited over the microheater to provide protection of the metallic microheater from chemical attack by the index-matching liquid within the trench. However, the surface topology variations along the target boundary line of contact may be to a layer other than the dielectric layer or to a substrate other than the heater substrate. The change in the surface topography may be used to "pin" the bubble along the target contact line. Thus, even if the bubble "bulges" laterally into the spacing between the two substrates, the bubble will be in a proper position against the trench sidewall at the interface between the trench and the input waveguide. The change in surface topography may be local depressions or may be local elevated regions. If the changes are provided by elevating regions, the material could have a low thermal conductivity, so that its lower surface temperature would further inhibit the lateral spread of the bubble.

In a third embodiment, the intentionally altered surface features are provided by removing substrate material from regions of the microheater substrate that correspond to the intended position of the microheater and then depositing a dielectric material within these regions. For example, dielectric material may be formed under or next to opposite sides of the microheater to provide thermal isolation, thereby reducing the loss of heat into the microheater substrate. However, the addition of the dielectric material is reduced in importance if the substrate material is removed so as to provide substantially vertical sidewalls which provide the desired abrupt transitions with regard to heat conductivity. By improving the delivery of heat to the bubbles, the size of the bubble may be increased without an increase in the required power.

In yet another embodiment, auxiliary trenches are formed near the main trench. An auxiliary trench on one or both sides of the main trench may be formed within the waveguide substrate or the heater substrate. The edges of the auxiliary trenches alter the surface energy balance so as to inhibit the lateral expansion or movement of the bubbles beyond the auxiliary trenches. Since the auxiliary trenches are also filled with the index-matching liquid and since the liquid has a lower thermal conductivity than the substrate material (e.g., silica), the auxiliary trenches present a thermal loss barrier from the "hot" crosspoint of the optical switch. As a result, the auxiliary trench or trenches may help to maintain both the size and the position of the thermally created and maintained bubble.

As a fifth embodiment, either or both of the trench walls and the spacing walls are treated to change the wettability of the walls. Thus, one or both of the surfaces of the waveguide substrate and the heater substrate may have a patterned film that provides an intrinsically different wettability to the index-matching liquid. By varying the surface wettability, the capillary forces acting at the bubble interface will increase. By changing the effective capillary forces in this manner, the stability of the confined bubble can be enhanced.

The desired surface wettability along the walls of the substrate-to-substrate spacing may be obtained by patterning an additional film on one or both of the substrates. As an example, gold may be deposited in the proximity of the trench. Further differences in the wettability relative to the underlying material (e.g., silicon oxide) can be induced by selective self assembly of organic functionalized orthosilicates or chlorosilanes onto the silicon oxide surface or through selective self assembly of alkane thiols onto the gold surface. Specific subgroups of interest are fluorinated long chain hydrocarbon chlorosilane and fluorinated long chain alkane thiol. The surface treatment of the walls of the trench may be designed to promote drying of the waveguide-to-trench interfaces when a bubble is formed, so that liquid residue is less likely to interfere with reflectivity performance. While general treatment of both the trench sidewalls and the substrate surfaces is contemplated, the result would be similar properties among all of the surfaces. However, there are benefits to treating only the spacing surfaces, treating only the trench sidewalls, or treating the spacing surfaces and the trench sidewalls differently.

Another possibility is to alter the surface above the microheater to promote capillary action which more efficiently transfers heat to the liquid in forming the bubble. A metal mesh, sintered metal, or other porous thin layer may be formed atop the heater region to provide capillary holes which draw fluid toward the microheater. Typically, after a bubble is formed, there is a continuous condensation at the top of the bubble and a continuous vaporization along the edges of the microheater. By maintaining a greater portion of the microheater in a wet condition, the optical switch is configured to enhance the ability of providing vaporization as needed, rather than confining vaporization to the edges of the microheater. Consequently, bubble stability is enhanced. Cooling fins may be added to this porous cover layer in order to promote dissipation of the heat when the microheater is deactivated.

One advantage of the invention is that bubble stability is improved. As a result, the optical performance of the optical switch will be improved. Another advantage is that enhanced stability is achieved without increasing the operating power requirements of the optical switch or the switching array in which the optical switch is a member. While additional processing steps are required, the additional steps are neither complex nor costly.

DETAILED DESCRIPTION

Figure 2:
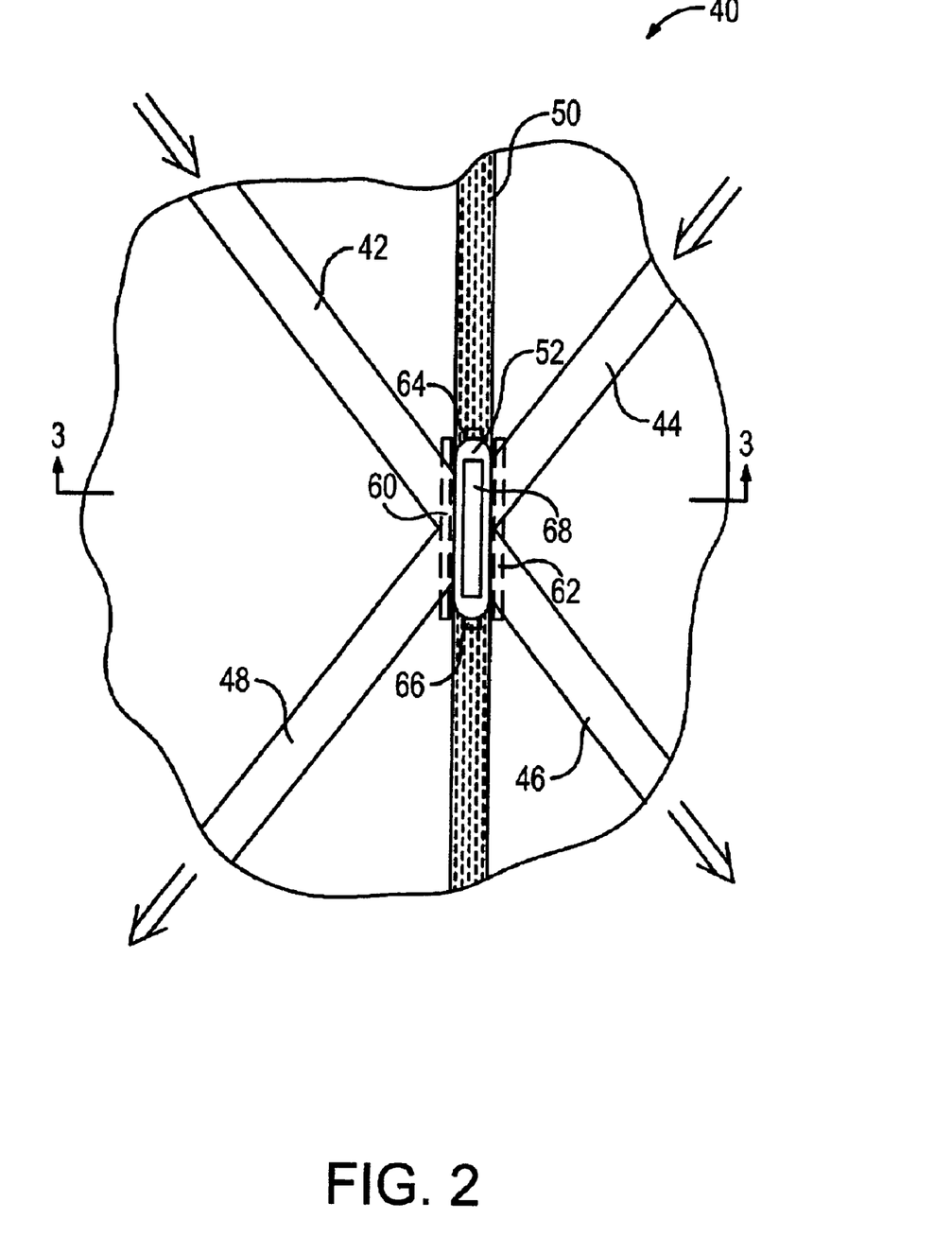
FIG. 2 is a top view of an optical switch having bubble-positioning surface features in accordance with the invention.
Figure 3:
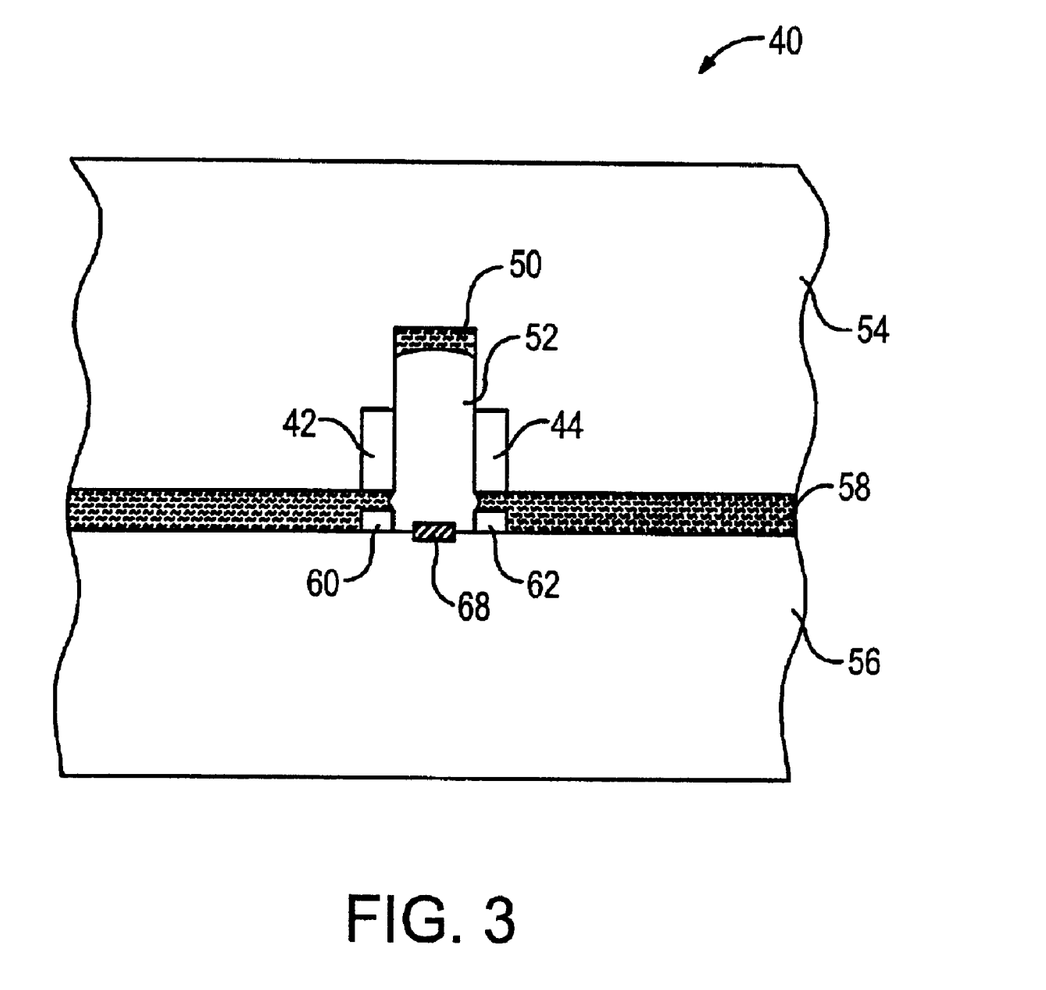
FIG. 3 is a side sectional view of the optical switch of FIG. 2 taken along lines 3—3.

With reference to FIGS. 2 and 3, an optical switch 40 is shown as including many of the features described with reference to FIG. 1. The optical switch includes four waveguide segments that will be referred to as first and second input waveguides 42 and 44 and first and second output waveguides 46 and 48. While not evident from the simplified drawings, the waveguides are formed in the conventional manner of encasing core material within upper and lower cladding layers, so that light is guided along the core material.

Each of the waveguides 42, 44, 46 and 48 has an end that intersects a liquid-containing trench 50. The optical switch 40 is shown in a reflective state, since a bubble 52 resides at the region of the trench that is abutted by the waveguides. The optical coupling among the waveguides is dependent upon the localized optical characteristics at this crosspoint. With the bubble 52 positioned as shown in FIG. 2, an input signal along waveguide 42 will encounter a mismatch in the refractive index at the sidewall of the trench. As a result, the optical signal will be reflected into the second output waveguide 48. For best performance of the optical switch 40 when the switch is in the reflective state, the angle of incidence of the waveguides 42, 44, 46 and 48 on the sidewalls of the trench 50 should be greater than the critical angle required for total internal reflection (TIR). However, the liquid within the trench 50 has a refractive index that is sufficiently close to the refractive index of the core material used in forming the waveguides that optical signals will freely propagate between the waveguides and the liquid within the trench. Thus, if the bubble 52 is allowed to condense and the liquid flows within the crosspoint region, the first input waveguide 42 will be coupled to the first output waveguide 46, while the second input waveguide 44 will be coupled to the second output waveguide 48.

As previously described, performance of the optical switch 40 is affected by the position of the bubble 52 relative to the trench-to-waveguide interfaces. If the surface area of the bubble 52 against the trench sidewall fully encompasses the lateral extents of the optical fields of the crossing waveguides, the reflection is at a stable maximum. However, any reduction below this full lateral extension of the optical fields will cause some optical loss. Moreover, if the bubble is unstable in its position, reflective characteristics of the switch will also be unstable. In FIGS. 2 and 3, surface features have been incorporated into the switch in order to stabilize the bubble and the switch performance. Other types of surface features will be described with reference to subsequent figures.

As best seen in FIG. 3, the optical switch 40 is formed of a waveguide substrate 54 and a heater substrate 56. The two substrates are bonded together, but are spaced apart along the region adjacent to the trench 50. As a result, a spacing 58 is formed between the two substrates 54 and 56. An advantage of this spacing is that it accommodates any volumetric expansion caused by bubble formation and bubble collapse. However, while it is desirable to accommodate changes in volume, the accommodation should not adversely affect the bubble stability. In the embodiment of FIGS. 2 and 3, raised barriers 60, 62, 64 and 66 are formed at the different sides of a microheater 68 for forming the bubble 52. The lateral barriers 60 and 62 are positioned within the spacing 58 adjacent to the trench 50. Thus, the longer two barriers control lateral expansion of the bubble 52 into the adjacent spacing 58. "Longitudinal control" of the bubble is provided by the end barriers 64 and 66. While these barriers are shown as being contained within the trench 50, if the trench is formed so that it is only slightly greater than that length of the bubble, the end barriers 64 and 66 may also be within the adjacent spacing.

The barriers 60, 62, 64 and 66 may be formed by depositing or growing a dielectric layer on the heater substrate 56. Photolithographic techniques may be employed, but other conventional approaches may be used. Since the dimensions of the barriers are not critical, relaxed fabrication tolerances are acceptable. A possible material for forming the barriers is silicon dioxide, but other materials may be substituted.

Figure 4:
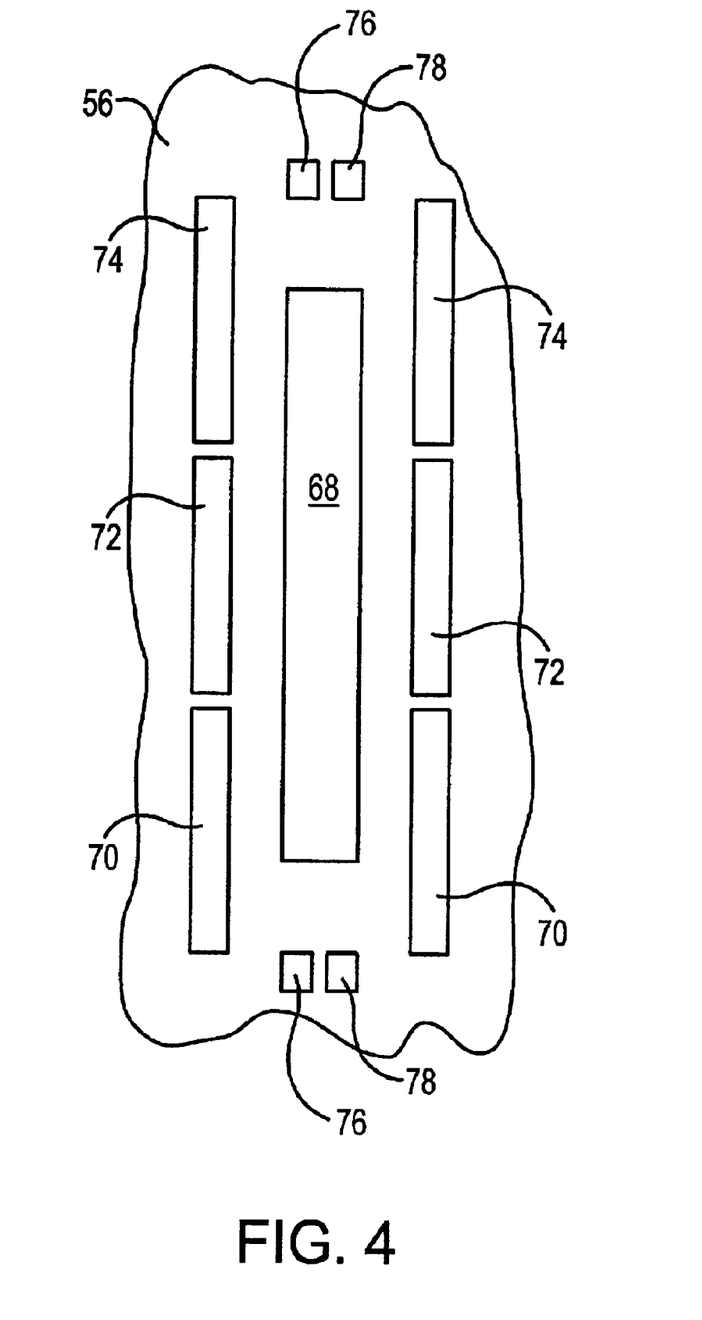
FIG. 4 is a top view of an alternative application of the bubble-positioning surface features of FIGS. 2 and 3.

There are a number of available alternatives to the illustrated barriers 60, 62, 64 and 66 of FIGS. 2 and 3. For example, rather than being formed on the heater substrate 56, the barriers may be formed on the waveguide substrate 54. As another alternative, the thickness of the barriers may be increased to contact both of the substrates 54 and 56, so that the barriers prevent (by physical blocking) the lateral expansion of the bubble 52, rather than merely reducing (by surface energy variations) the lateral expansion of the bubble into the adjacent spacing 58. As another variation, the barriers may be segmented. This is shown in FIG. 4, which provides three segments 70, 72 and 74 at each of the opposite long sides of the microheater to control lateral expansion of the bubble and provides two segments 76 and 78 at the shorter sides of heater to control longitudinal bubble expansion.

Figure 5:
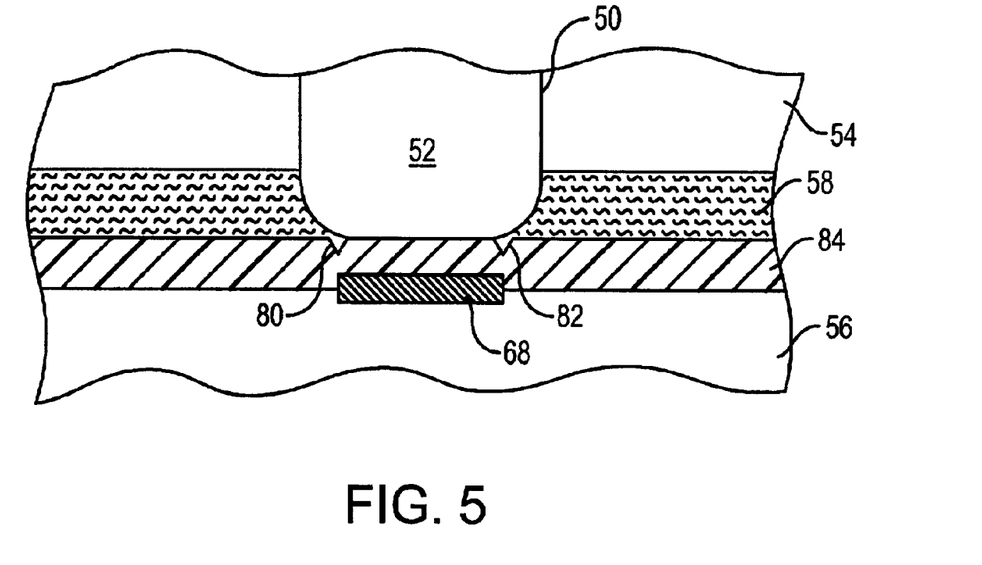
FIG. 5 is a side sectional view of the trench region of the optical switch in accordance with one application of a second embodiment.
Figure 6:
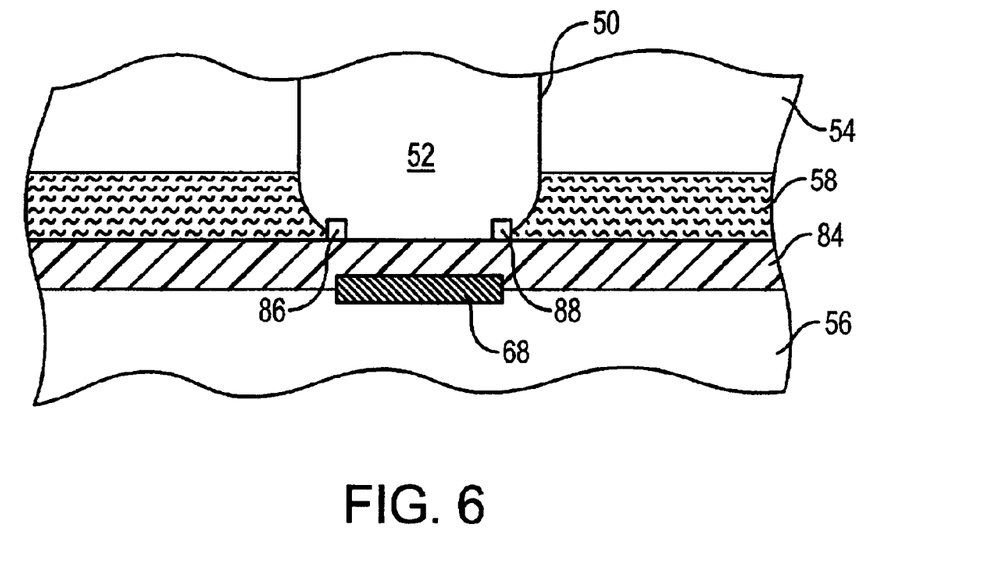
FIG. 6 is a side sectional view of the trench region of the optical switch in accordance with a second application of the second embodiment.

FIGS. 5 and 6 illustrate a second approach to providing bubble stability, performance, and thermal stability within an optical switch. Within this approach, the intentional alterations to surface topography are implemented as surface variations along a target boundary line of contact between the bubble 52 and the structure of the optical switch. It is considered beneficial to form the surface variations at the edges of the microheater 68, or at least close to the microheater edges. However, the surface variations may be along the target boundary line of bubble contact with the walls which include the ends of the waveguides or along the target boundary line of bubble contact with the top wall of the waveguide substrate. The change in the surface topography "pins" the bubble along the target contact line. In FIG. 5, the surface features are shown as being local depressions 80 and 82 within a dielectric layer 84. The dielectric layer may be one that is often used to protect the metallic microheater from chemicals of the index-matching fluid. The localized depressions may be isotropic or anisotropic pits formed using conventional photolithographic techniques, since the geometry of the depressions is not a major issue.

In FIG. 6, the depressions are replaced with raised regions 86 and 88. The raised regions function in the same manner as the localized depressions 80 and 82 of FIG. 5. In order to inhibit lateral spread of the bubble 52, the material used to form the raised regions should have a low thermal conductivity. Photolithographic patterning of a dielectric material adds very little to the cost and complexity of the process for forming an optical switch.

Even if the bubble 52 "bulges" laterally into the spacing 58 between the two substrates 54 and 56, the bubble will be in a proper position against the sidewall of the trench 50 at the interface between the trench and the waveguides (which are not shown in FIG. 5 or 6). The depressions 80 and 82 or raised regions 86 and 88 may extend around the entire microheater 68, thereby providing longitudinal stability, as well as the lateral stability.

Figure 7:
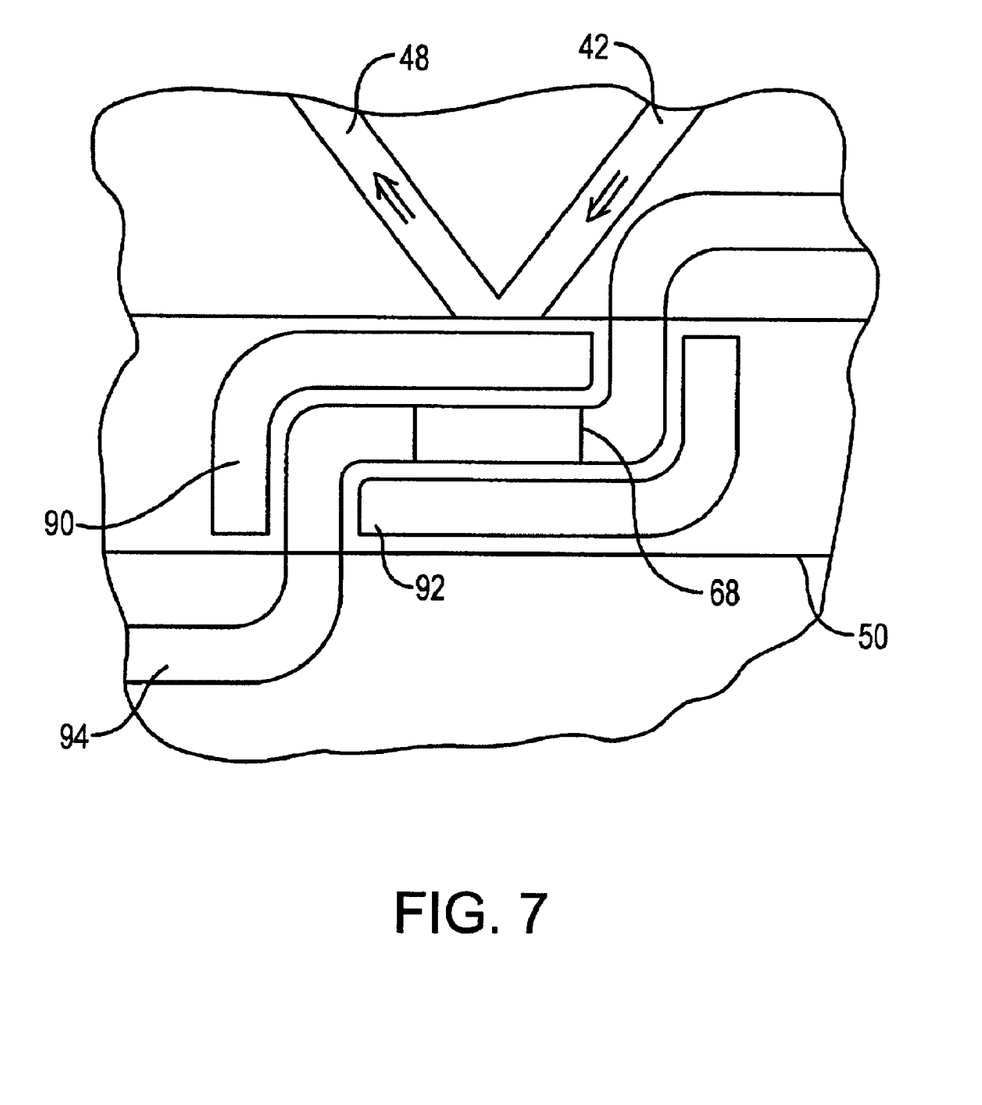
FIG. 7 is a top view of the trench region of the optical switch in accordance with a third embodiment.

Referring now to FIG. 7, another embodiment is shown in a top view, but only the first input waveguide 42 and the second output waveguide 48 are illustrated. In this embodiment, the intentionally altered surface features are dielectric-filled cavities 90 and 92 within the surface of the heater substrate. The dielectric-filled cavities provide additional thermal insulation, reducing the loss of heat into the heater substrate. As a result, the delivery of heat to the bubble is significantly improved. An abrupt transition in heat-conduction conditions provides desired results, so forming substantially vertical cavity walls is beneficial. One available approach to forming cavities having substantially vertical walls is referred to as the Bosch process, which uses vacuum and plasma etching (dry etching) techniques. With the abrupt transitions in thermal dynamics that are provided by the vertical walls of the cavities, the addition of the dielectric filler material becomes less important. Consequently, the regions 90 and 92 may be empty cavities in some embodiments.

In the top view of FIG. 7, the dielectric-filled cavities are shown as two dielectric regions 90 and 92 that follow the curvature of a conductive path 94 along the heater substrate. The conductive path 94 is a trace that provides actuator current to the microheater 68. The conductive path is a conventional component of a heater substrate of an optical switch. The microheater 68 is connected to the underlying conductive path 94, so that the heater can be activated and deactivated based upon supplying current through the conductive path.

The heater substrate may be formed of silicon, which is etched in a pattern to accommodate the dielectric (or sometimes void) regions 90 and 92. The dielectric material has a low thermal conductivity relative to the substrate material. Consequently, the heat from the microheater is less likely to radiate in a pattern that causes the bubble to expand laterally into the substrate-to-substrate spacing. The dielectric material may be silicon dioxide or any other material that is nonconductive and that has a significantly lower thermal conductivity than the substrate material.

Figure 8:
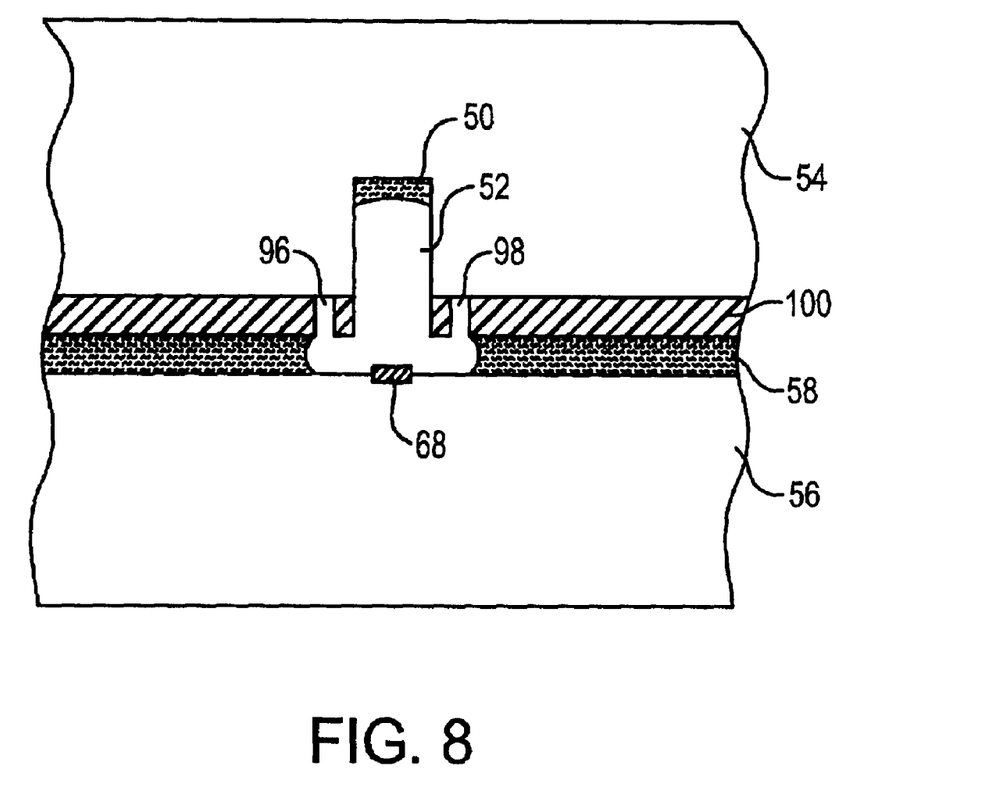
FIG. 8 is a side sectional view of the tench region of the optical switch in accordance with a fourth embodiment.

Another embodiment of the invention is shown in FIG. 8. In this embodiment, auxiliary trenches 96 and 98 are formed adjacent to the main trench 50. The edges of the auxiliary trenches alter the surface energy balance, so as to inhibit the lateral expansion of the bubble 52. Additionally, since the auxiliary trenches 96 and 98 are filled with the index-matching liquid when the switch is in its transmitting state, and since the index-matching liquid has a lower thermal conductivity than the substrate material (e.g., silica or silicon), the auxiliary trenches present a barrier to thermal loss from the heated waveguide crosspoint of the optical switch. Therefore, the auxiliary trenches may help in maintaining the size and position of the thermally created and maintained bubble 52.

The auxiliary trenches 96 and 98 are shown as being formed within a dielectric layer 100 on the surface of the waveguide substrate 54. However, the auxiliary trenches may be formed in the substrate material itself. As a substitute or as an addition to the auxiliary trenches 96 and 98 in the waveguide substrate 54, auxiliary trenches may be formed in the heater substrate 56. An advantage of forming the auxiliary trenches within the heater substrate is that the trenches may be formed in closer alignment with the lateral edges of the main trench 50.

Figure 9:
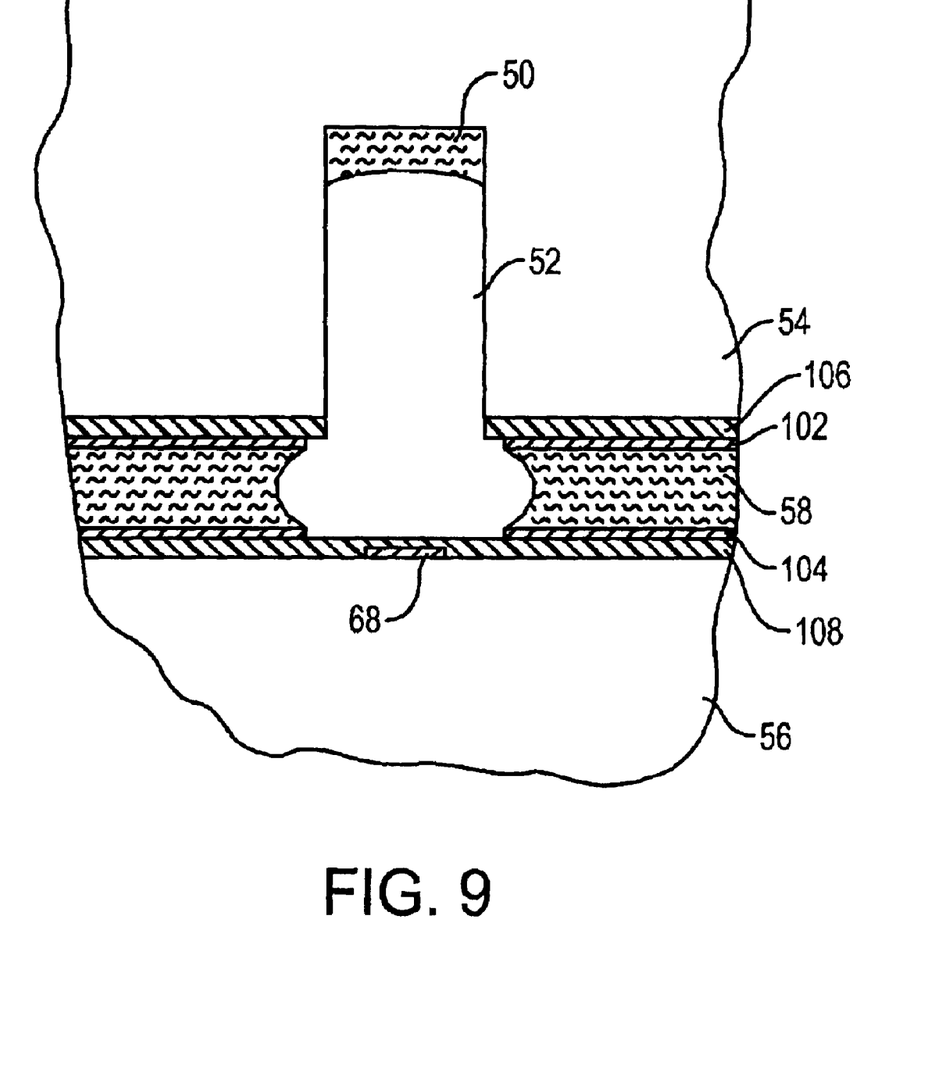
FIG. 9 is a side sectional view of the trench region of the optical switch in accordance with a fifth embodiment.

In the embodiment of FIG. 9, added layers 102 and 104 on the surfaces of the waveguide substrate 54 and the heater substrate 56 provide the desired surface features within the substrate-to-substrate spacing 58. The layers 102 and 104 are designed to provide a target surface wettability within the spacing. The wettability affects the capillary forces at the bubble interface with the liquid within the spacing. Thus, the angle of incidence between the bubble and each layer is more predictable and stable. As shown in FIG. 9, the bulges into the spacing 58 have an angle of incidence that is significantly different than the bulge of the residue index-matching liquid within the top of the trench 50. Capillary action induces forces on the liquid within the spacing 58 to "creep" along the surfaces of the added layers 102 and 104 to the ends of the layers.

In one embodiment, the added layers 102 and 104 are patterned on the two substrates 54 and 56 to only be in the area close to the trench 50. The selection of the layer should be such that it provides an intrinsically different wettability to the fluid, relative to the underlying layer. In FIG. 9, the underlying layers may be silicon dioxide layers 106 and 108 and the added layer may be gold. On the other hand, the "added" layers may be treatments of the silicon dioxide material. For example, if the substrates 54 and 56 are silica substrates having silicon oxide films, differences in wettability can be induced by the selective self assembly of organic functionalized orthosilicates or chlorosilanes onto the silicon oxide surface. A specific subgroup that achieves target wettability characteristics is fluorinated long chain hydrocarbon chlorosilane. For the embodiment in which the added layer is gold, selective self assembly of alkane thiols onto the gold surface may provide the target wettability characteristics. A specific acceptable subgroup is fluorinated long chain alkane thiol. Optionally, the index-matching fluid includes an additive that does not significantly affect the refractive index of the fluid, but reduces the likelihood that the fluid will attack the layers. As another possible layer material, the added layer may be a polymer, such as a fluorinated polymer.

Figure 10:
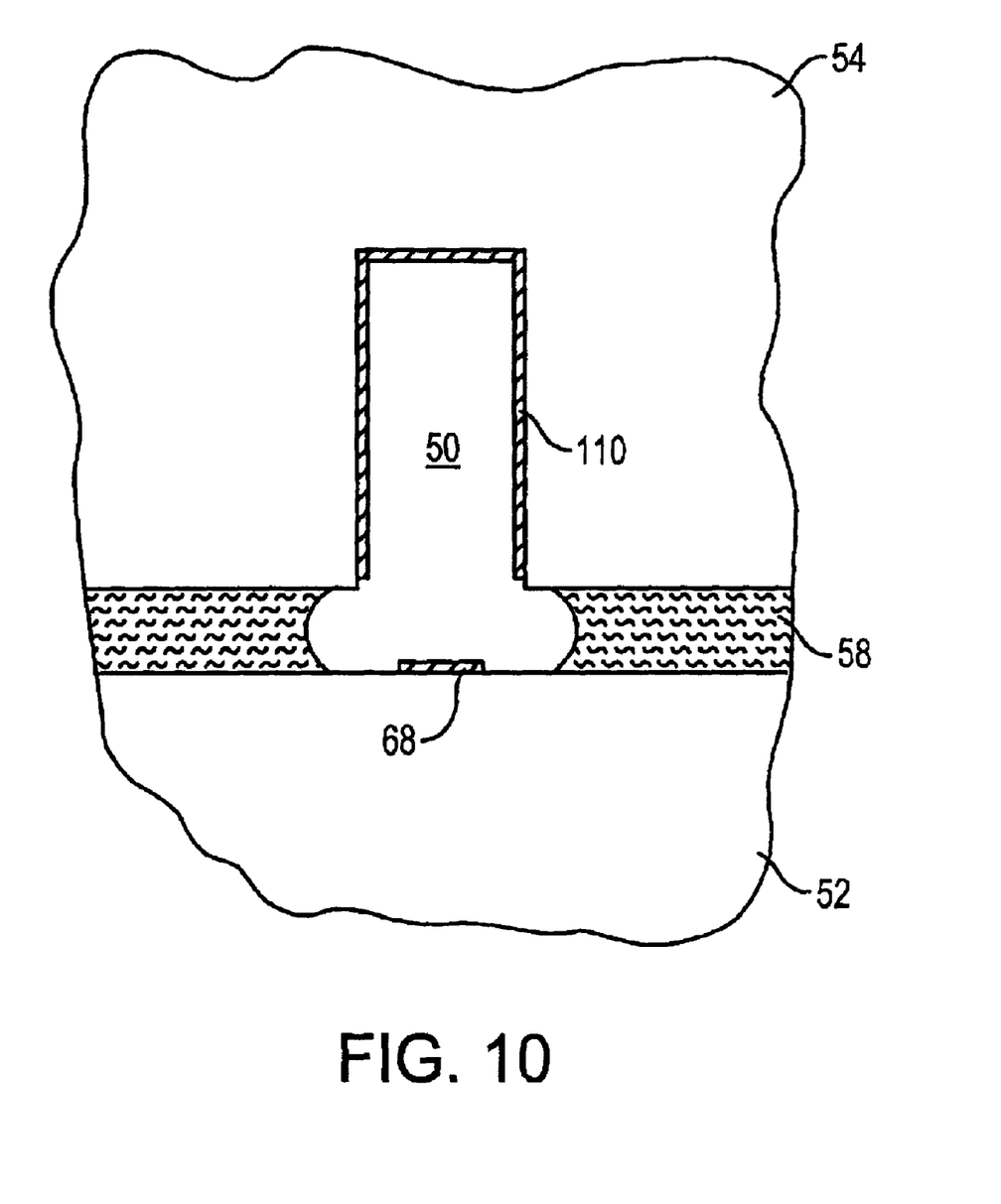
FIG. 10 is a side sectional view of the trench region of the optical switch, with a hydrophobic film on the walls of the trench.

Referring now to FIG. 10, as an addition or as a substitute for the added layers 102 and 104, the trench 50 may be coated with a hydrophobic film 110 to reduce the likelihood that residue liquid will remain along the optical window formed by the interface of the trench 50 and one of the waveguides. The residue liquid could adversely affect the performance of the optical switch, since its index-matching properties will allow an input signal to enter for a short distance into the bubble-containing trench that is intended to provide total internal reflection. The shape of the residue will affect the induced reflection at the interface of the residue and the bubble. The hydrophobic film 110 reduces the likelihood of residue along the optical window. The film may be formed of a polymer, such as a fluorinated polymer (e.g., PTFE). An additive may be introduced into the index-matching liquid to further promote dewetting.

While the hydrophobic film 110 of FIG. 10 is shown as being used without any of the previously described techniques for controlling bubble expansion within the substrate-to-substrate spacing 58, the film is preferably used with at least one of the other approaches. For example, the added layers 102 and 104 may be formed of the same material as the hydrophobic film 110. However, the layers 102 and 104 are preferably formed separately, so that the layers and the film may be individually tailored to achieve their separate goals. Similarly, the different approaches to pinning the bubble may be combined. As one example, the use of the layers 102 and 104 to enhance capillary forces may be combined with the approach of FIG. 5, where local depressions 80 and 82 are formed at or near the edges of the microheater 68 in order to provide bubble control.

Figure 11:
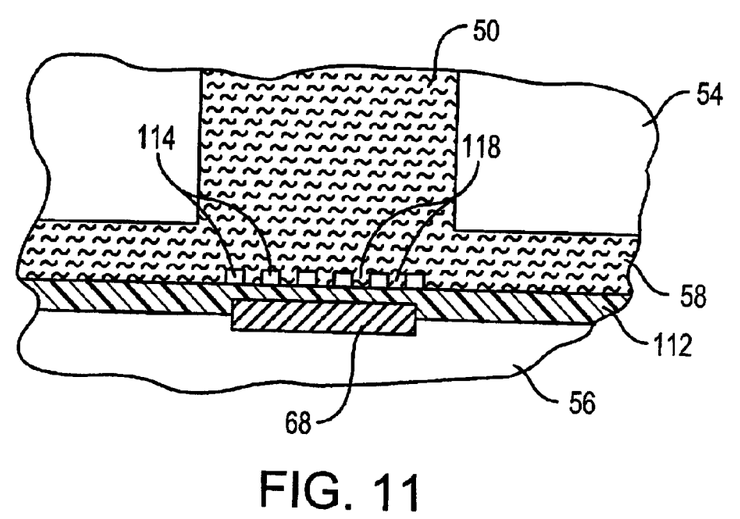
FIG. 11 is a side sectional view of the trench region of the optical switch in accordance with a sixth embodiment.
Figure 12:
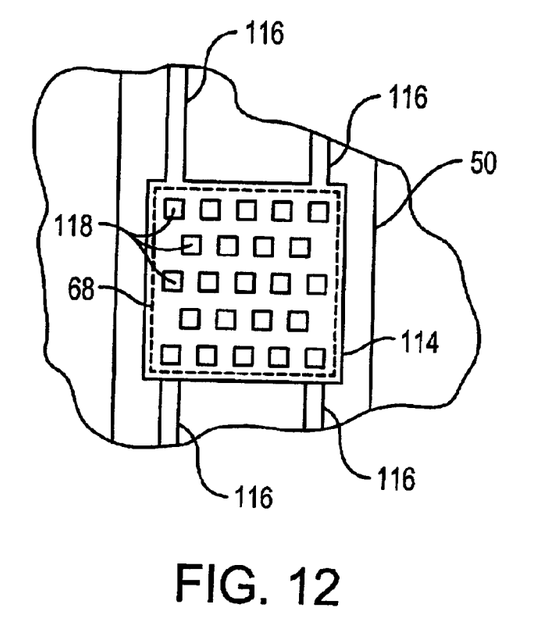
FIG. 12 is a top view of the embodiment of FIG. 11.

Another approach to providing bubble stability is illustrated in FIGS. 11 and 12. A thin layer 114 is formed to include capillary holes 118 and cooling fins 116. This layer is shown as being spaced apart from the microheater 68 by a dielectric layer 112, but other arrangements are possible. The thin layer may be a metal mesh, sintered metal, or other porous thin layer that is configured to draw fluid toward the microheater by capillary forces. The intent is to increase the portion of the heater region that is wet, thereby increasing the ability of the microheater to provide vaporization as needed. Within the conventional structure, vaporization is confined to the edges of the heater region after the bubble begins to be formed. Bubble stability is enhanced by drawing the liquid toward the heater region for wider area vaporization. The cooling fins 116 promote heat dissipation when the microheater is deactivated.

As one option, the thin layer 114 that is configured to induce capillary forces may be formed of gold. The gold layer may be electroplated onto the dielectric layer 112 and then etched using conventional photolithographic techniques. However, other materials and other deposition and patterning approaches may be used without diverging from the invention.

What is claimed is:

1. In a method of fabricating an optical switch having a microheater in heat-transfer relationship with a liquid-containing trench that is intersected by an optical waveguide, wherein said optical switch has a transmissive state in which liquid is at an interface of said trench with said optical waveguide and said optical switch has a reflective state in which a bubble is at said interface, said method comprising the steps of:

using first and second substrates in forming said microheater and said trench and said optical waveguide, including intentionally modifying surface features of at least one of said first and second substrates to control escape of said bubble from said trench when said optical switch is in said reflective state, wherein intentionally modifying surface features includes forming raised barriers on at least one of said first and second substrates; and connecting said first substrate to said second substrate such that spacing exists between said first and second substrates adjacent to said trench, including designing said first and second substrates such that said intentionally modified surface features control the position of said bubble relative to said trench and said spacing.

2. The method of claim 1 wherein said raised barriers partially obstruct movement of said bubble into said spacing between said first and second substrates.

3. The method of claim 2 wherein forming said raised barriers includes providing material in positions adjacent to said trench when said first and second substrates are aligned.

4. The method of claim 3 wherein said forming said raised barriers includes providing islands of dielectric material, with said islands being on multiple sides of said microheater.

5. The method of claim 1 wherein using said first and second substrates includes forming said microheater on said first substrate and wherein intentionally modifying said surface features includes creating topological features at target positions for a boundary line of contact with said bubble.

6. The method of claim 5 wherein said creating said topological features includes patterning a dielectric layer atop said first substrate and includes depressions in said dielectric layer at said target positions.

7. The method of claim 5 wherein said creating said topological features includes forming raised regions having positions that are based upon locations of said boundary line of contact, said raised regions being formed of a material having a significantly lower thermal conductivity than said microheater.

8. The method of claim 1 wherein intentionally modifying said surface features includes varying surface wettability of at least one of said first and second substrates within said spacing, thereby varying capillary forces within said spacing in a region adjacent to said trench.

9. The method of claim 8 wherein varying said surface wettability includes depositing a layer to increase said capillary forces within said spacing relative to capillary forces within said trench.

10. The method of claim 1 wherein intentionally modifying said surface features includes removing substrate material from surface region of said first substrate and depositing a thermal insulation layer within said surface regions, said first substrate being a heater substrate, said microheater being formed on said heater substrate in a position such that said thermal insulation region provides thermal protection of said heater substrate from edges of said microheater to said thermal insulation layer.

11. The method of claim 1 wherein intentionally modifying includes forming auxiliary trenches adjacent to said trench in order to retard said position or a geometry of said bubble within said spacing between said first and second substrates.

12. The method of claim 1 wherein said intentionally modifying includes forming an exposed conductive coating atop said microheater such that said exposed conductive coating includes openings which attract liquid by capillary action.

13. The method of claim 1 wherein said intentionally modifying includes forming cavities having substantially vertical sidewalls within said first substrate, thereby providing abrupt transitions with respect to heat conduction along a surface of said first substrate, said first substrate having said microheater, said cavities being formed near said microheater.

14. An optical switch comprising:

a waveguide substrate having at least two waveguide segments on a first surface, including a first waveguide segment that intersects a trench, said trench having a liquid with a refractive index such that light propagates from said first waveguide segment when said liquid is at an interface of said first waveguide segment with said trench;

a heater positioned to heat said liquid within said trench sufficiently to form a bubble, said bubble having space to expand longitudinally within said trench and laterally from said trench; and surface features that enable lateral expansion or movement of said bubble from said trench while controlling said lateral expansion or movement beyond said surface features, thereby providing stability with regard to maintaining said bubble at said interface when said heater is activated, wherein said surface features include raised barriers that partially obstruct movement of said bubble.

15. The optical switch of claim 14 further comprising a heater substrate on which said heater resides and to which said waveguide substrate is connected, said heater arid waveguide substrates being spaced apart within an area adjacent to said trench and said raised barriers partially obstruct said movement of said bubble into said spaced apart area.

16. The optical switch of claim 14 wherein said surface features include a coating of material to achieve target capillary force characteristics within a space through which said bubble moves laterally from said trench.

17. The optical switch of claim 14 wherein said surface features include a patterned layer that extends to a level closer to said trench than said heater.

18. The optical switch of claim 14 wherein said surface features are depressed regions positioned to define a target boundary line of contact with said bubble when said heater is activated.

19. The optical switch of claim 17 wherein said surface features are raised regions positioned to define a target boundary line of contact with said bubble when said heater is activated.

20. The optical switch of claim 14 wherein said heater has a high thermal conductivity and wherein said surface features include regions of low thermal conductivity adjacent to and partially under said heater, said heater and said regions of low thermal conductivity being different layers on a common heater substrate.

21. An optical switch comprising:

a waveguide substrate having a pair of waveguide segments spaced apart by a liquid-containing region within said waveguide substrate, said waveguide segments being optically coupled when liquid is aligned with said waveguide segments;

a heater substrate connected to said waveguide substrate, said heater substrate having a heater positioned to form a bubble within said liquid-containing region, said heater and waveguide substrates being spaced apart by a spacing that extends laterally from said liquid-containing region, said liquid being free to flow into said spacing from said liquid-containing region; and a barrier to lateral movement of said bubble from said trench through said spacing, said barrier being raised and constructed to maintain said freedom of said liquid to flow into said spacing.

22. The optical switch of claim 21 wherein said barrier includes patterned material that extends from one of said waveguide and heater substrates toward the other and that is within said spacing.

23. The optical switch of claim 22 wherein said patterned material resides on said heater substrate and has first and second portions within said spacing on opposite sides of said heater, said patterned material further having third and fourth portions on opposite sides of said heater but within said liquid-containing region of said waveguide substrate.

24. The optical switch of claim 21 wherein said barrier is raised about said heater to define a boundary line of contact between said bubble and said heater substrate.

25. An optical switch comprising:

at least two light paths that intersect a trench having a liquid with a refractive index such that light propagates from one of said light paths into said trench when said liquid is at an interface of said light path with said trench;

a heater positioned to heat said liquid within said trench sufficiently to form a bubble; and a cover layer on said heater, said cover layer having openings constructed to promote capillary action in directing said liquid toward said heater.

26. The optical switch of claim 25 wherein said cover layer is a thermally conductive material.

27. The optical switch of claim 26 wherein said cover layer includes cooling fins extending away from said heater to dissipate heat when said heater is deactivated.

28. An optical switch comprising:

a waveguide substrate having a pair of waveguide segments spaced apart by a liquid-containing region within said waveguide substrate, said waveguide segments being optically coupled when liquid is aligned with said waveguide segments;

a heater substrate connected to said waveguide substrate, said heater substrate having a heater positioned to form a bubble within said liquid-containing region, said heater and waveguide substrates being spaced apart by a spacing that extends laterally from said liquid-containing region, said liquid being free to flow into said spacing from said liquid-containing region; and auxiliary trenches adjacent to said trench in order to retard said position or said geometry of said bubble within said spacing between said waveguide and heater substrates.

29. An optical switch comprising:

a waveguide substrate having at least two waveguide segments on a first surface, including a first waveguide segment that intersects a trench, said trench having a liquid with a refractive index such that light propagates from said first waveguide segment when said liquid is at an interface of said first waveguide segment with said trench;

a heater positioned to heat said liquid within said trench sufficiently to form a bubble, said bubble having space to expand longitudinally within said trench and laterally from said trench, and a surface feature that varies surface wettability of at least one of said waveguide substrate, said heater substrate, and said trench.

30. The optical switch of claim 29 wherein said surface feature includes a layer on the surface of at least one of said waveguide and heater substrates to increase capillary forces within said spacing relative to capillary forces within said trench.

31. The optical switch of claim 29 wherein said surface feature includes a hydrophobic film coating said trench.

32. An optical switch, comprising:

a waveguide substrate having at least two waveguide segments on a first surface, including a first waveguide segment that intersects a trench, said trench having a liquid with a refractive index such that light propagates from said first waveguide segment when said liquid is at an interface of said first waveguide segment with said trench;

a heater positioned to heat said liquid within said trench sufficiently to form a bubble, said bubble having space to expand longitudinally within said trench and laterally from said trench; and regions of low thermal conductivity adjacent to and partially under said heater, said regions of low thermal conductivity being different layers on said heater substrate.

33. The optical switch of claim 32 wherein said regions of law thermal conductivity comprise dielectric-filled cavities within said heater substrate.

* * * * *